No. 649,386. Patented May 8, 1900.
R. L. WOODLING.
PLANTER.
(Application filed Dec. 21, 1899.)
(No Model.) 2 Sheets—Sheet 1.
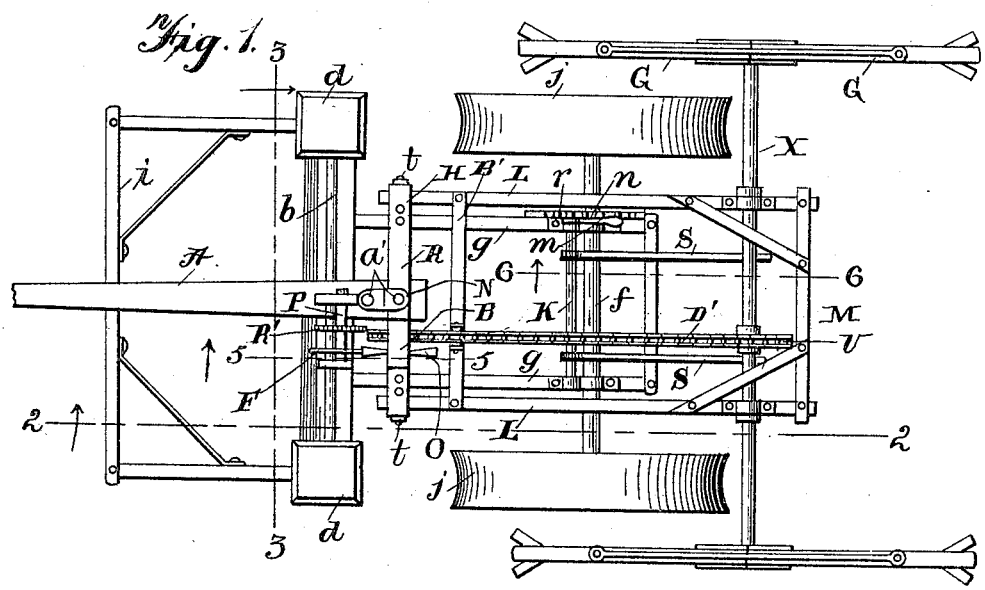
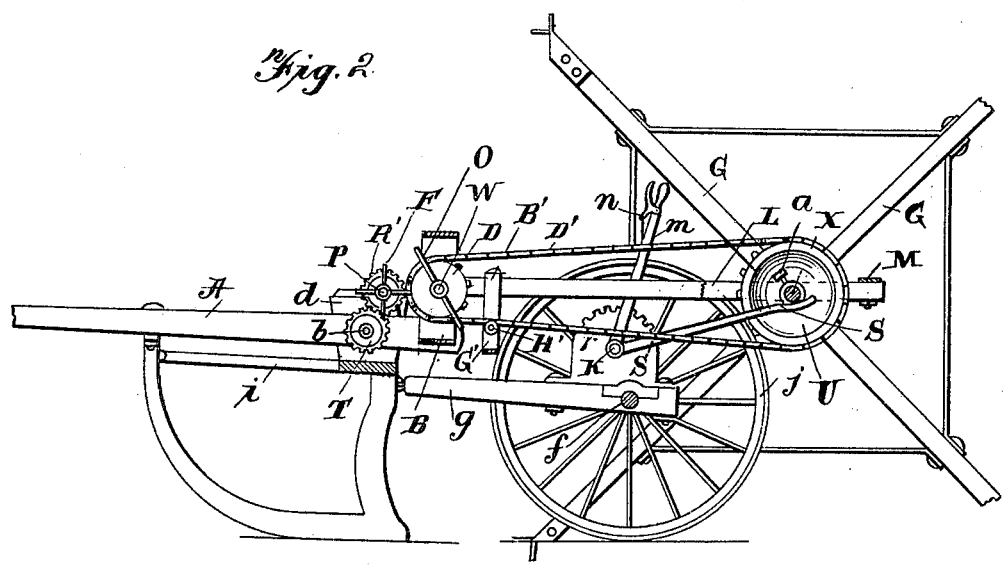
Witnesses
Geo. E. Frech.
Chas. R. Wright Jr.
Inventor
R. L. Woodling
by A. S. Pattison
Attorney.
THE NORRIS PETERS CO., PHOTO-LITHO., WASHINGTON, D. C.

No. 649,386. Patented May 8, 1900.
R. L. WOODLING.
PLANTER.
(Application filed Dec. 21, 1899.)
(No Model.) 2 Sheets—Sheet 2.
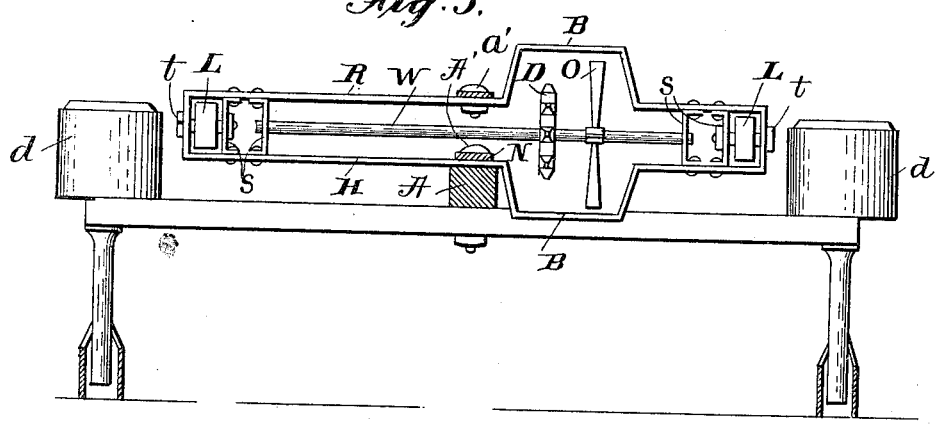
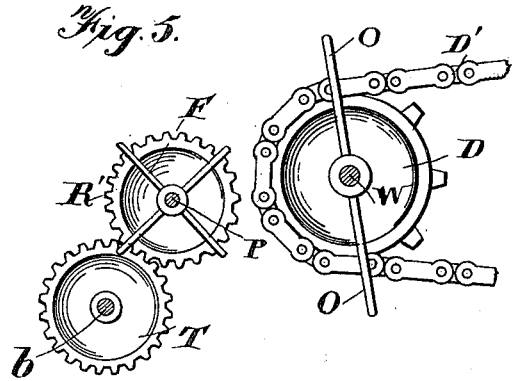
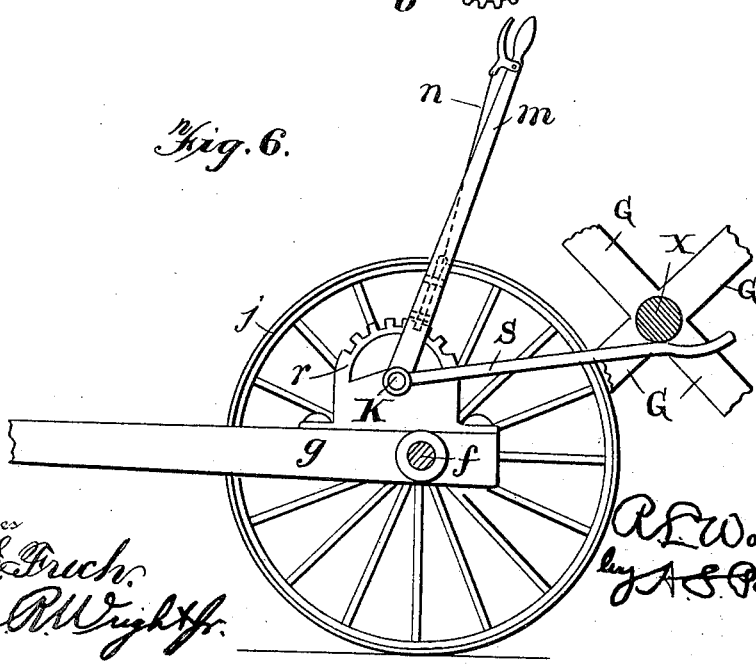

UNITED STATES PATENT OFFICE.

REASON L. WOODLING, OF LOGANSPORT, INDIANA.

PLANTER.

SPECIFICATION forming part of Letters Patent No. 649,386, dated May 8, 1900.

Application filed December 21, 1899. Serial No. 741,175. (No model.)

*To all whom it may concern:*

Be it known that I, REASON L. WOODLING, a citizen of the United States, residing at Logansport, in the county of Cass and State of Indiana, have invented new and useful Improvements in Planters, of which the following is a specification.

My invention relates to improvements in check-row corn-planters, and pertains to a planter which is especially adapted for planting corn, all of which will be fully described hereinafter and particularly pointed out in the claims.

In the accompanying drawings, Figure 1 is a top plan view of a planter with my invention applied thereto. Fig. 2 is a vertical longitudinal section taken on the line 2 2 and looking in the direction indicated by arrow in Fig. 1. Fig. 3 is a vertical transverse sectional view taken on the line 3 3 of Fig. 1 and looking from the front of the planter, as indicated by arrow in said Fig. 1. Fig. 4 is a detached end elevation of the sprocket-chain tightener. Fig. 5 is an enlarged sectional view upon the line 5 5 of Fig. 1 looking in the direction indicated by arrow and showing the cog-wheels and the striking-arm mechanism for operating the planting devices. Fig. 6 is a sectional view on the line 6 6 of Fig. 1 and showing the lever for lifting the actuating mechanism out of operative position.

In the accompanying drawings, A indicates the tongue of an ordinary planter, which is connected with the seedboxes in the usual manner; $g$, the wheel-frame of the planter, which is hinged at its front end to the runner-frame $i$ and at its rear end is suitably connected with the supporting-axle $f$, to the outer ends of which are journaled the supporting and covering wheels $j$. Passing across the rear of the runner-frame and having its ends suitably and operatively connected with any desired planting mechanism situated within the seedboxes $d$ is a shaft $b$. Thus far I have explained a planter which is of the ordinary construction, and I will now proceed to explain that part of the mechanism and frame which constitutes my invention and by means of which the shaft $b$ is operated for effecting the planting of the seed or corn.

My invention pertains to a floating frame which has its front end supported by the draft-tongue A of the planter and entirely independent of the wheel-frame of the planter, which has heretofore been described. This frame consists of a metal cross-bar R, which is constructed from a strap of iron, and this strap of iron is bent, respectively, upward and downward to constitute the intermediate reversed - U - shaped portions B and the outwardly-extending upper and lower parallel portions H. Extending across between these parallel portions H are the webs $s$, in which the ends of a shaft W are journaled, and this shaft W carries an eight-tooth sprocket-wheel D and two diametrically oppositely arranged projecting arms O, the operation and function of which will be more fully described hereinafter. The side portions of this floating frame of my attachment consist of the parallel extending draft-bars or shafts L, which have their forward ends situated between the parallel horizontal portions H of the front end of the frame before referred to, and the front ends of these shafts or bars L are pivotally connected with the said cross-bar R by means of the horizontal bolts $t$, as clearly illustrated in Fig. 3, which construction permits the draft-bars and the mechanism carried thereby to freely vertically vibrate at its rear end independently of the front piece of the frame. The rear ends of these shafts or draft-bars L are connected by means of a cross-bar M, and the cross-bar M and the draft-bars L are suitably braced in any desirable manner to make a rigid U-shaped frame.

Especial attention is directed to the manner in which the front cross-bar R of my invention is attached to the tongue A of the planter. By reference to Fig. 3 it will be seen that this cross-bar R is situated upon the upper face or top of the inner or rear end of the tongue and that a king-bolt A' passes through the lower horizontal portion H of the cross-bar R and through the tongue. An L-shaped strap N has its front end connected with the tongue A and its rear end bent upward and over the top of the upper horizontal portion H of the cross-bar R, and passing through the rear end of this strap N and the upper portion of the metallic end piece is a short bolt $a'$. This arrangement is situated entirely above and out of connection with all parts of the planter excepting the draft-tongue, as will be seen, and this arrangement enables the metallic cross-bar R, and consequently its frame, to vibrate horizontally independent of the other portions of the planter.

From this construction it will be seen that since the draft-bars or shafts L have an independent vertical movement and the cross-bar R, to which the shafts L are connected, has a horizontal movement my attachment has a vertical and a horizontal movement independent of the planter.

Journaled to the rear ends of the side bars L is a driving-shaft X, which has attached to each end projecting arms G, with metal foot-pieces for engagement with the ground and by the said engagement when the planter is drawn along to cause the rotation of the driving-shaft X. This driving-shaft X carries a sixteen-toothed sprocket-wheel U, and passing around this sprocket-wheel U and the eight-toothed sprocket-wheel D is a sprocket-chain D' and by means of which motion is conveyed from the driving-shaft to the sprocket D and its shaft, and consequently a rotation given to the arms O.

Journaled just above and in rear of the shaft $b$, which is operatively connected at its opposite ends with the dropping mechanism, as before described, is a shaft P, which carries a cog-wheel R', the said cog-wheel R' being in turn in mesh with the cog-wheel T. The said shaft also carries four arms F, arranged at right angles to each other, as illustrated, and with which arms F the arms O upon the shaft W are adapted to engage, and to thus cause a corresponding rotation of the shaft P and the cogs R' T, and consequently the shaft $b$, for effecting the operation of the dropping mechanism situated within the seed-boxes. The dropping mechanism situated within said seedboxes forms no part of my present invention and may be of any desired construction, and it is not therefore necessary that the same be either shown or described in the present application.

In operation when the planter is drawn along the driving-shaft X is rotated by the engagement of the arms G with the ground, and at each engagement of the arms the driving-shaft is given one-quarter rotation and the shaft W, and consequently the arms O, carried thereby, given one-half of a revolution, and the arms O by engagement with one of the arms F, carried by the shaft P, cause the latter shaft to have a quarter-rotation, and this same amount of movement is conveyed to the shaft $b$ by means of the cog-wheel T, which is of the same diameter as the cog R', carried by the shaft P. It will thus be seen that at each quarter-rotation of the driving-shaft X the shaft $b$ is given a half-rotation and the seeds are dropped at each side of the planter opposite the points indicated by the metal plates on the end of the arms G.

By means of the construction here shown the frame, which is comprised of the metallic cross-bar R, the side bars L, and the rear cross-bar M, together with its driving mechanism, is permitted to have a free up-and-down movement, and since the bars L are pivoted in a line with the journal of the shaft W the parts are permitted to vibrate without in any manner affecting the operation of the parts or causing any binding thereof, as will be readily understood.

For the purpose of elevating the driving mechanism out of contact with the ground when turning at the ends of the rows or when transporting the machine from field to field I provide a mechanism for lifting the driving-shaft and the arms G out of contact with the ground. This mechanism consists of an L-shaped lever S, which is pivoted at the point K upon the wheel-frame $g$ of the planter, the vertical portion of the lever carrying a handle $m$, adapted to actuate a pawl $n$ for engagement with a cog-segment $r$, and the lower horizontal portion of the lever S extending under the shaft X, as illustrated in Fig. 6, by means of which the said shaft may be elevated or lowered, as desired.

In order to enable the sprocket-chain D' to be kept taut, I provide a tightener therefor which consists of a metal bar B', which has its end connected with the draft-bars or shafts L and extending downward at the center, as illustrated in Fig. 4. Projecting upward from this bar B' are the two arms G'', between which is journaled a sheave H', said sheave resting under and adapted to support the sprocket-chain D'. The shaft of this sheave H' is adjustably supported by means of the arm G' in any suitable manner, one of which may be by providing the said arms with a series of vertical openings adapted to receive the said shaft.

From the above description it will be noted that I have provided a driving mechanism which is adapted to be attached to a planter and constructed to have both an independent and horizontal movement in respect to the said planter and without in any manner affecting the operation of the parts by tending to bind them in any manner whatever.

For the purpose of enabling the dropping mechanism to be set when beginning to plant a row, so that the corn will be dropped in a line with the marks made by the metal foot-pieces on the ends of the arms G of the shaft X, I have the sprocket-gear U loose from the driving-shaft X and adapted to be attached thereto by means of a thumb screw or screws $a$. By means of this arrangement the thumb-screws can be loosened and the sprocket-wheel turned, and consequently the dropping mechanism actuated, so that it will drop at the points marked by the arms G and the set-screws again tightened, when the machine will operate and cause the planting of the corn at the indicated points and in a line with what has been previously planted.

Having thus described my invention, what I claim, and desire to secure by Letters Patent, is—

1. A planter comprising a runner-frame carrying a dropping mechanism, a tongue for the runner-frame, and a rearwardly-extending floating frame intermediately and vertically pivotally connected directly to the rear end of the tongue, the floating frame carrying an operating mechanism operatively connected with the said dropping mechanism, substantially as described.

2. A planter comprising a runner-frame carrying a dropping mechanism, a tongue for the runner-frame having its rear end projecting inward beyond and in rear of the runner-frame, and a floating frame having its front end intermediately and vertically pivotally connected directly to the rearwardly-projecting end of the said tongue, the floating frame having an operating mechanism operatively connected with the said dropping mechanism, substantially as described.

3. A planter comprising a runner-frame carrying a dropping mechanism, a tongue for the runner-frame having its rear end projecting inward beyond and in rear of the runner-frame, a floating frame having a transversely-arranged front cross-bar intermediately and vertically pivotally connected to the rear projecting end of the said tongue, the side bars of the floating frame horizontally pivotally connected with the ends of the said transverse cross-bar thereof, the floating frame having an operating mechanism operatively connected with the said dropping mechanism, substantially as described.

4. The combination in a planter of a runner-frame, and a floating frame, the front cross-bar of the floating frame vertically pivotally connected with the runner-frame, and the longitudinal bars of the floating frame horizontally pivotally connected with the said transverse cross-bar, the floating frame carrying an actuating mechanism operatively connected with the dropping mechanism of the runner-frame, substantially as described.

5. A corn-planter comprising a runner-frame having a draft-tongue and carrying a dropping mechanism, a floating frame having its front end intermediately and vertically pivotally connected with the rear end of the tongue, the sides of the frame having their front ends horizontally pivotally connected with the ends of the said vertically-pivoted end of the floating frame, a driving-shaft carried by the rear end of the said frame, and carrying operating means for engagement with the ground, and an operative connection between the driving-shaft and the dropping mechanism, substantially as described.

6. A corn-planter comprising a runner-frame having a draft-tongue and carrying a dropping mechanism, a rearwardly-extending floating frame loosely connected at its front end with the said draft-tongue to permit it to move vertically, a driving-gear carried by said floating frame and having its journal concentric with the connection of the vertically-movable frame, a driving-shaft carried by the floating frame and carrying means for engagement with the ground, and operative connections between the driving-shaft and the dropping mechanism, substantially as described.

7. A planter comprising a runner-frame carrying a dropping mechanism, said dropping mechanism including a shaft carrying a gear, and radially-extending arms, and a driving mechanism independent of the runner-frame, said driving mechanism carrying radially-extending arms extending in a line with and adapted to engage in succession the said radial arms, substantially as described.

8. In a planter the combination of a runner-frame, a floating frame connected with the runner-frame and carrying at its front end an operating-shaft, the sides of the floating frame journaled concentric with the journal of the operating-shaft, the rear end of the frame carrying an operating-shaft, a sprocket-chain connecting the driving-shaft and the first said shaft, the first said shaft carrying means for actuating the dropping mechanism, substantially as described.

9. In a planter the combination with a runner-frame carrying a draft-tongue and a dropping mechanism, of a floating frame having its front end composed of upper and lower horizontally-extending portions, a shaft longitudinally arranged and journaled within said front end of the frame, the draft-tongue situated below the lower horizontal portion, a bolt passing through the tongue and the lower horizontal portion, and a strap having its forward end connected with the tongue and its rear end pivotally connected to the upper horizontal portion of the end piece, substantially as described.

10. A planter comprising a runner-frame carrying a dropping mechanism, a vertically-movable floating frame, the runner-frame having a tongue, the floating frame carrying a driving mechanism operatively connected with the dropping mechanism, the floating frame connected with the tongue and movable independent thereof, the driving mechanism including a longitudinally-arranged sprocket-chain, and a vertically-movable chain-tightener carried by said vertically-movable floating frame, substantially as described.

11. In a planter, the combination with a runner-frame, of a floating frame having its front end composed of upper and lower horizontally-extending portions, a shaft longitudinally arranged and journaled within the said front end of the frame between the said horizontal portions, the said front bar having a pivotal connection with the runner-frame, substantially as described.

12. In a planter, the combination with a runner-frame, of a floating frame having its front transverse bar composed of upper and lower horizontal portions, a shaft journaled between the said horizontal portions, the side bars of the frame having their forward ends horizontally and pivotally connected between the ends of the said horizontal portions, substantially as described.

13. In a planter the combination with a runner-frame, of a floating frame having its front transverse bar composed of parallel horizontal portions, a longitudinally-arranged shaft having its ends journaled between the horizontal portions at points removed from the ends thereof, and the side bars of the said frame horizontally and pivotally connected between the horizontal portions of the said bar and at points outside of the ends of the said shaft, substantially as described.

14. In a planter the combination with a runner-frame, of a floating frame having its front bar composed of horizontal upper and lower portions, the said horizontal portions having deflected portions B between their ends, a shaft journaled between the said horizontal portions and provided with driving-gears situated thereon at the laterally-extending portions B thereof, substantially as described.

In testimony whereof I have hereunto set my hand in the presence of two subscribing witnesses.

REASON L. WOODLING.

Witnesses:
BENJAMIN F. LOUTHAIN,
HARRY T. TOMLINSON.